May 13, 1924.

H. A. MURRAY

HAY TUCKING DEVICE

Filed Dec. 10, 1923

Witness.
F. C. Gibson.

Inventor
H. A. Murray.
By Clarence A. O'Brien
Attorney

May 13, 1924.

H. A. MURRAY

HAY TUCKING DEVICE

Filed Dec. 10, 1923    2 Sheets-Sheet 2

Patented May 13, 1924.

1,494,007

UNITED STATES PATENT OFFICE.

HARRY A. MURRAY, OF WYATT, MISSOURI.

HAY-TUCKING DEVICE.

Application filed December 10, 1923. Serial No. 679,837.

*To all whom it may concern:*

Be it known that I, HARRY A. MURRAY, a citizen of the United States, residing at Wyatt, in the county of Mississippi and State of Missouri, have invented certain new and useful Improvements in Hay-Tucking Devices, of which the following is a specification.

This invention relates to certain new and useful improvements in hay bailing presses, and has particular reference to an improved hay tucking device for presses of this kind.

The primary object of the invention is to provide a hay tucking device through the use of which the hay may be formed into bails devoid of projecting loose ends of the hay so as to present a neat and compact appearance, and whereby the hay may be in a most desirable condition for the market.

Another object of the invention is to provide a hay tucking device of the above kind, which embraces the desired qualities of simplicity and durability of construction, as well as efficiency in operation.

Still another object of the invention is to provide a hay tucking device of the above kind that is thoroughly reliable in its action and depends for its operation upon the movement of the plunger of the bailing press relative thereto, as well as the movement of the hay in the bailing box of the bailing press relative to the same.

Other objects will appear as the nature of the same is better understood, and the same consists in the novel form, combination, and arrangement of parts, hereinafter more fully described, shown in the accompanying drawings, and claimed.

In the drawings, wherein like reference characters indicate corresponding parts throughout the several views.

Figure 1:
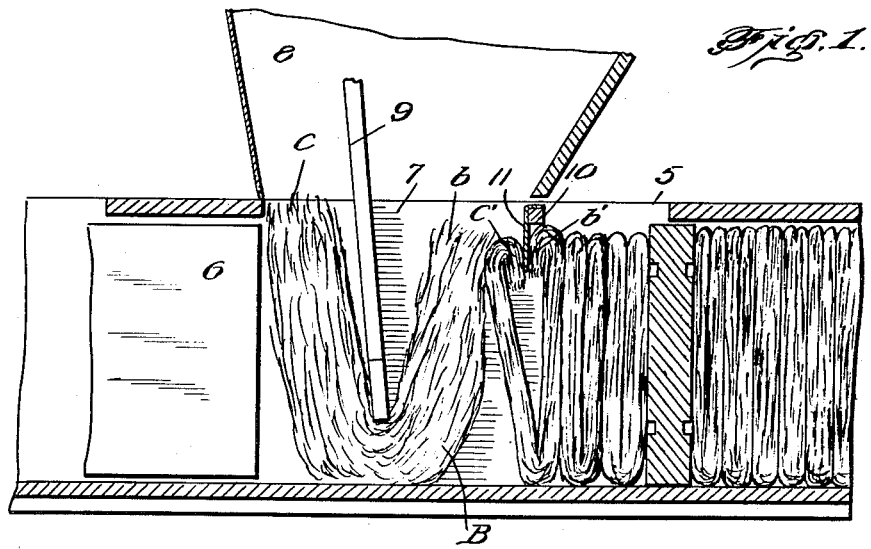
Figure 1 is a fragmentary longitudinal sectional view, of a bailing press equipped with hay tucking mechanism constructed in accordance with the present invention, and showing the apparatus in one position of its operation.

Referring more in detail to the drawings, 5 indicates the press box of an ordinary conventional form of bailing press, and in which the hay is compressed and formed into bails in a well known general manner, the compression of the hay being effected by means of a horizontally reciprocable plunger 6 movable in the box 5 and equipped with any suitable operating means. The press box 5 is provided with the usual openings 7 at the top thereof, through which the hay is fed into the box 5 from the hopper 8, disposed above the opening 7. The hay is usually fed from the hopper in suitable bundles that are folded intermediate their ends, as at B in Figure 1, by means of a suitable vertically reciprocating element 9.

The present invention embodies a rock shaft 10, suitably journalled in the sides of the press box 5 directly beneath the front wall of the hopper 8, and within the forward portion of the opening 7, the ends of said rock shaft 10 projecting outwardly beyond the sides of the press box 5. Extending transversely of the press box 5 from side to side thereof is a tucking blade or plate 11, the upper portion of which is suitably flanged over the rock shaft 10 and rigidly secured to the latter by means of bolts 12 or the like, and projecting rearwardly from the ends of the rock shaft 10 and preferably removably secured to the latter are a pair of parallel normally horizontal arms 13, the rear ends of which are bifurcated to form forks 14.

Suitably mounted at each side of the bottom portion of the press box 5, are rearwardly projecting arms 15 to the rear ends of which are pivoted, as at 16, the lower ends of longitudinally swinging guide rods 17, upon the upper ends of which are slidably mounted collars 18, that are partially embraced by the forks 14 of the arms 13 and to which said forks are pivotally connected, as at 19, whereby the arms 13 may assume different angular positions relative to the guide rods 17.

Adjustable longitudinally along the guide rod are collars 20, whose adjustment may be maintained by means of set screws 21 carried by the collars and adapted to engage the guide rods 17. Coil compression springs 22 are disposed about the guide rods 17, and the upper ends of these springs bear upon the lower ends of the collars 18, while the lower ends of said springs bear upon the upper ends of the collars 20, so as to normally maintain the arms 13 substantially horizontal with the tucking plate or blade 11 depending in a substantially vertical position, as shown in Figure 1. From this construction, it will be seen that the tucking blade or plate 11 is free to be forced forwardly and upwardly for tilting the arm 13 downwardly against the action of the springs 22, and that the tension of said springs may be regulated by adjusting the collars 20.

Figure 2:
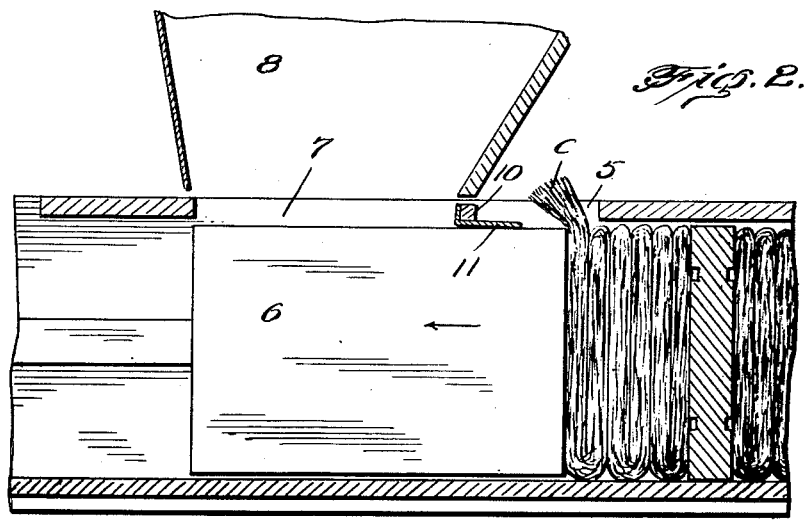
Figure 2 is a view similar to Figure 1, illustrating the apparatus in its usual position.
Figure 3:
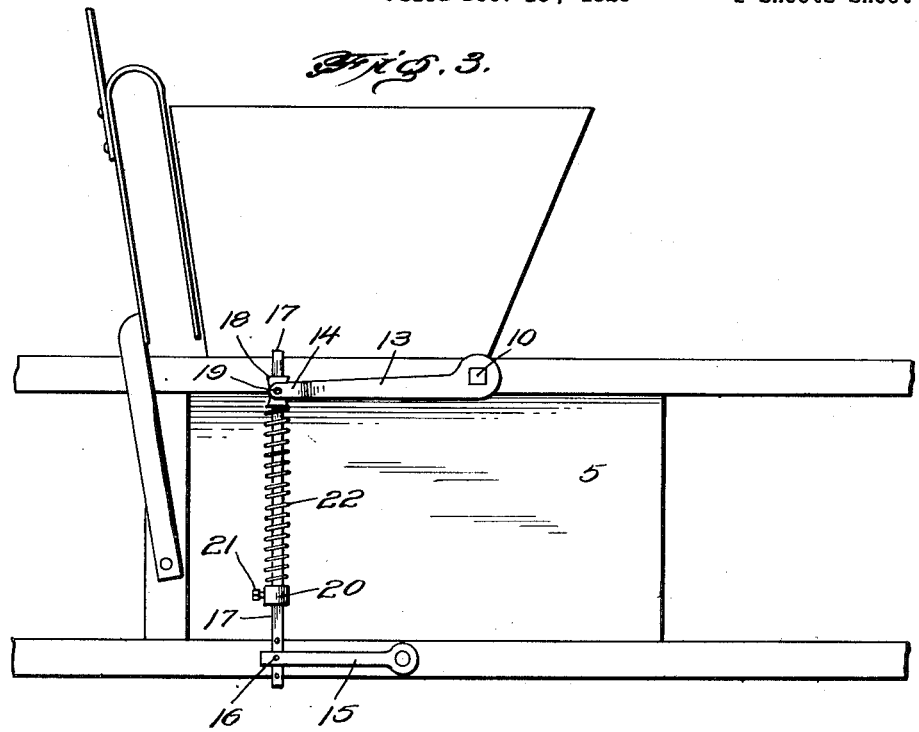
Figure 3 is a side elevational view of the device shown in Figure 1.
Figure 4:
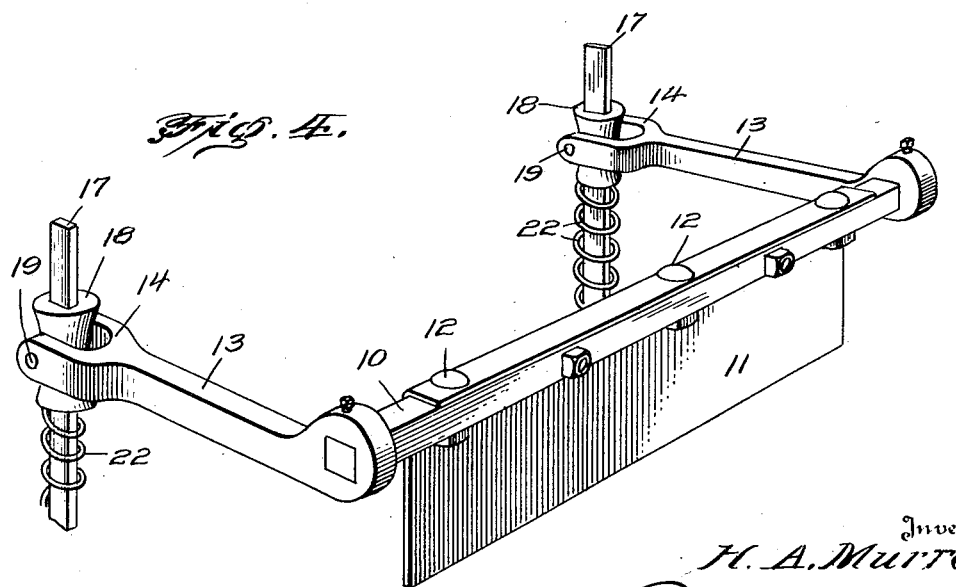
Figure 4 is an enlarged fragmentary perspective view showing the major part of the construction of the present device detached.

In operation, the hay is fed into the bailing box 5 in the form of a bundle B that is forced downwardly through the opening 7 by means of the vertically reciprocable member 9, so that the bundle of hay will assume a substantially U-shaped form as shown in Figure 1, rearwardly of the tucking blade 11 and with the ends of the hay disposed at the top of the press box. Upon forward movement of the plunger 6, the bundle of hay is forced forwardly past the tucking blade 11, so that the forward projecting end portions as at $b$ of the bundle will be turned rearwardly and downwardly as indicated at $b'$, in Figure 1. Upon continued forward movement of the plunger 6, the latter engages the blade 11, so as to force the same upwardly and forwardly to a horizontal position, as illustrated in Figure 2, so that the bundles of hay may be effectively compressed in the bailing operation. The last bundle formed will thus be forced in front of the tucking blade 11 with the rear projecting ends of the hay in the bundle projecting upwardly through the opening 7 as indicated at $b'$, which ends are those indicated at $c$ in Figure 2. Upon completion of its pressing stroke, the plunger 6 will move rearwardly, so as to allow the hay to expand sufficiently to allow the last bundle to move past the tucking blade 11 as the latter is allowed to automatically return to its vertical position, and when this takes place, the projecting ends, at $c'$ will be turned forwardly and downwardly as indicated in Figure 1. This operation will be continued with each bundle that is to be compressed to form part of the bail being formed, and such bail of hay will be devoid of free projecting ends so as to preserve a desirable and neat appearance and a superior product.

From the foregoing description, it is believed that the construction and operation as well as the advantages of the present invention will be readily understood and appreciated by those skilled in the art.

What I claim as new is:

1. A tucking attachment for bailing presses comprising a rock shaft having a normally depending tucking blade fixed thereto, and adapted to be journalled transversely of and in the sides of a press box, rigid arms carried by the ends of the rock shaft and adapted to project rearwardly therefrom, collars pivotally carried by the rear ends of said arms, guide rods upon which said collars are slidable, means for pivotally mounting the lower ends of the guide rods at opposite sides of the bailing press, for longitudinal vertical swinging movement, and yieldable means carried by the guide rod and engaging the first named collars for normally holding the same upwardly with the tucking blade assuming a normal vertical depending position.

2. A tucking attachment for bailing presses comprising a rock shaft having a normally depending tucking blade fixed thereto and adapted to be journalled transversely of and in the sides of a press box, rigid arms carried by the ends of the rock shaft and adapted to project rearwardly therefrom, collars pivotally carried by the rear ends of said arms, guide rods upon which said collars are slidable, means for pivotally mounting the lower ends of the guide rods at opposite sides of the bailing press for longitudinal vertical swinging movement, and yieldable means carried by the guide rod and engaging the first named collars for normally holding the same upwardly with the tucking blade assuming a normal vertical depending position, and means forming an abutment for the lower ends of said spring and adjustable longitudinally of the guide rods to adjust the tension of said springs.

In testimony whereof I affix my signature.

HARRY A. MURRAY.

Witness:
BERTHA J. MURRAY.